(12) United States Patent  (10) Patent No.: US 11,625,961 B2
Mueller et al.  (45) Date of Patent: Apr. 11, 2023

(54) METHOD FOR MODELING A COMPRESSOR INTAKE TEMPERATURE AND/OR A COMPRESSOR DISCHARGE TEMPERATURE OF A COMPRESSOR, AND A CONTROL UNIT, AND A MOTOR VEHICLE

(71) Applicant: Volkswagen Aktiengesellschaft, Wolfsburg (DE)

(72) Inventors: Sven Mueller, Hannover (DE); Till Stoetzel, Rostock (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/407,920

(22) Filed: Aug. 20, 2021

(65) Prior Publication Data

US 2022/0058896 A1   Feb. 24, 2022

(30) Foreign Application Priority Data

Aug. 21, 2020 (DE) .................. DE10 2020 210 642

(51) Int. Cl.
*G07C 5/08* (2006.01)

(52) U.S. Cl.
CPC .................. *G07C 5/0808* (2013.01)

(58) Field of Classification Search
CPC .. G07C 5/0808; F02B 2037/125; F02B 37/12; F02D 2041/1432; F02D 2200/0402; F02D 2200/0406; F02D 41/0007; F02D 2200/0416; F02D 2200/703; Y02T 10/12; F04B 49/00; F04B 2205/10; F04B 2205/11

See application file for complete search history.

(56) References Cited

U.S. PATENT DOCUMENTS

| 9,091,202 B2 | 7/2015 | Styles et al. |
| 10,781,744 B2 | 9/2020 | Nau et al. |
| 2004/0115064 A1 | 6/2004 | Bleile et al. |

(Continued)

FOREIGN PATENT DOCUMENTS

| DE | 10241892 A1 | 3/2004 |
| DE | 102008054764 A1 | 7/2010 |
| DE | 102016205680 A1 | 10/2017 |

(Continued)

*Primary Examiner* — Joseph J Dallo
(74) *Attorney, Agent, or Firm* — Muncy, Geissler, Olds & Lowe, P.C.

(57) ABSTRACT

The invention relates to a method for modeling a compressor intake temperature and/or a compressor discharge temperature of a compressor taking into account a compressor surge, wherein the method comprises:

Identifying a pressure gradient across the compressor

Identifying a mass flow gradient across the compressor

Establishing that the compressor surge is present when the pressure gradient exceeds an upper pressure gradient limit and the mass flow gradient falls below a lower mass flow gradient limit; and Identifying the compressor intake temperature with a temperature correction factor that is dependent on the compressor surge and/or identifying the compressor discharge temperature on the basis of a corrected compressor discharge pressure that is dependent on the compressor surge.

15 Claims, 7 Drawing Sheets

(56) References Cited

U.S. PATENT DOCUMENTS

2018/0106262 A1* 4/2018 Carpenter ............. F04D 29/058
2022/0058896 A1* 2/2022 Mueller ............... G07C 5/0808

FOREIGN PATENT DOCUMENTS

| DE | 102016220543 B3 | 2/2018 |
| DE | 102018201376 A1 | 8/2019 |
| DE | 112011104763 B4 | 10/2019 |
| EP | 3181875 A1 | 6/2017 |
| EP | 3514354 A1 | 7/2019 |
| WO | WO-2021124205 A1 * | 6/2021 |

* cited by examiner

METHOD FOR MODELING A COMPRESSOR INTAKE TEMPERATURE AND/OR A COMPRESSOR DISCHARGE TEMPERATURE OF A COMPRESSOR, AND A CONTROL UNIT, AND A MOTOR VEHICLE

This nonprovisional application claims priority under 35 U.S.C. § 119(a) to German Patent Application No. 102020210642.8, which was filed in Germany on Aug. 21, 2020, and which is herein incorporated by reference.

BACKGROUND OF THE INVENTION

Field of the Invention

The present invention relates to a method, a corresponding control unit, and a corresponding motor vehicle for modeling a compressor intake temperature and/or a compressor discharge temperature of a compressor of an exhaust turbocharger for an internal combustion engine. Here, the modeling takes into account an occurrence of a compressor surge.

Description of the Background Art

A so-called "compressor surge" can occur with compressors in unfavorable operating states when the mass flow falls below a minimum mass flow at a certain pressure. When a mass flow is too small, an angle of incidence at the compressor blades becomes so large that stalling of the mass flow occurs. Consequently, less momentum is transferred to the flow medium, causing the mass flow to decrease further and the flow to stall at additional compressor blades as well. A pressure difference between an intake and a discharge of the compressor can no longer be maintained, thus causing a backflow through the compressor.

Modern boost pressure control methods are based on physical models of the air path to an internal combustion engine. Adherence to the component limits of components along the air path is accomplished by limiting a boost pressure setpoint and/or while taking into account a turbocharger speed modelled through a compressor. In the determination of the turbocharger speed and of the base boost pressure, a correction factor for the compressor discharge temperature is used that is not modeled sufficiently accurately. Firstly, the temperature at the compressor intake is not modeled, and secondly an effect of compressor surge is not taken into account. This leads to deviations in the turbocharger speed modeling that must be considered critical, especially for modeled speeds at the maximum speed limit. In addition, the accurate modeling of the compressor discharge temperature represents the basis for startup of an electric exhaust turbocharger booster, so that a power reduction of the power train of the internal combustion engine is possible for component protection.

EP 3181875 A1 describes a method for determining a charging gas discharge temperature of a charging gas from an exhaust turbocharger. In the method, the charging gas discharge temperature is identified while taking into account a charging gas discharge temperature correction value, wherein the charging gas discharge temperature correction value is based on an exhaust gas temperature deviation between an exhaust gas reference temperature and an exhaust gas actual temperature. The said exhaust gas actual temperature can be, for example, the exhaust gas temperature currently measured before the compressor of an exhaust turbocharger. A compressor surge is not taken into account in EP 3181875.

DE 102016220543 B3 discloses a method for detection of a compressor surge of a turbocompressor of an internal combustion engine, wherein the compressor surge of the turbocompressor of the internal combustion engine is detected on the basis of a comparison of phase information of a signal of a first pressure buildup and phase information of a second signal of the internal combustion engine.

SUMMARY OF THE INVENTION

It is therefore an object of the present invention to provide alternative and improved methods and devices for modeling a compressor intake temperature and/or a compressor discharge temperature of a compressor.

According to an exemplary embodiment of the invention, a method is provided for modeling a compressor intake temperature and/or a compressor discharge temperature of a compressor, taking into account a compressor surge, comprising: identifying a pressure gradient across the compressor; identifying a mass flow gradient across the compressor; establishing that the compressor surge is present when the pressure gradient exceeds an upper pressure gradient limit and the mass flow gradient falls below a lower mass flow gradient limit; and identifying the compressor intake temperature with a temperature correction factor that is dependent on compressor surge and/or identifying the compressor discharge temperature on the basis of a corrected compressor discharge pressure that is dependent on compressor surge.

Here, the compressor intake temperature is the temperature of a fluid, such as air, when it flows into the compressor, and thus corresponds to a compressor intake gas temperature or a compressor intake fluid temperature. Accordingly, the compressor discharge temperature is the temperature of the fluid when it flows out of the compressor, and consequently corresponds to a compressor discharge gas temperature or a compressor discharge fluid temperature. "On the compressor intake side" and "before the compressor" mean upstream of the compressor, while "on the compressor discharge side" and "after the compressor" mean downstream of the compressor.

The compressor can be part of an exhaust turbocharger for an internal combustion engine of a motor vehicle. The internal combustion engine can be a spark ignition engine or a diesel engine, for example.

With the method, at least one of the compressor intake temperature and the compressor discharge temperature is modeled while taking compressor surge into account. In this context, "modeling" can include at least one of the following: determining, identifying, calculating, and the like. The phenomenon of "compressor surge" is described above.

In the method, the pressure gradient across the compressor is identified. The pressure gradient is the behavior of the pressure change as a function of location. The phrase "across the compressor" means the path from the compressor intake side to the compressor discharge side.

Furthermore, the mass flow gradient across the compressor is identified. The mass flow gradient is the behavior of the mass flow change as a function of location. The mass flow relates here to the indrawn air that is guided along an intake tract across the compressor to the internal combustion engine. As a rule, a quantity of the indrawn air can be at least partially adjusted by means of an appropriate throttle valve.

The intake tract comprises all components of the internal combustion engine that carry combustion air and are located before a combustion chamber of the internal combustion engine.

The identification of the pressure gradient and/or of the mass flow gradient can be made through appropriately arranged acquisition devices such as sensors and/or compressor characteristic maps. Thus acquisition devices for measuring pressure, such as pressure sensors, can be used in order to sense the compressor intake pressure and/or the compressor discharge pressure. In this context, the compressor intake pressure is the pressure of the fluid on the compressor intake side and the compressor discharge pressure is the pressure of the fluid on the compressor discharge side. In addition, acquisition devices for measuring the (air) mass flow before and/or after the compressor can be used, such as, e.g., a flow sensor.

On the basis of the identified pressure gradient and the identified mass flow gradient across the compressor, it is possible to establish a presence of pressure surge. This is because a sharply decreasing mass flow with a simultaneous (or slightly delayed) sharp pressure increase after the compressor is characteristic of compressor surge. This pressure increase occurs as a result of the inertia of an air column and of a rotor of the exhaust turbocharger. The mass flow across the compressor subsequently stalls when the surge limit is exceeded, causing the pressure after the compressor to drop.

In order to now detect the compressor surge, the pressure gradient and the mass flow gradient across the compressor are checked against corresponding thresholds. In other words, it is established that the compressor surge is present when the pressure gradient exceeds the upper pressure gradient limit and the mass flow gradient falls below the lower mass flow gradient limit. In this context, "exceed" is intended to mean that the pressure gradient is greater than or equal to the upper pressure gradient limit. Accordingly, "fall below" is intended to mean that the mass flow gradient is less than or equal to the lower mass flow gradient limit.

The upper pressure gradient limit and the lower mass flow gradient limit are predetermined limit values. Here, the upper pressure gradient limit can be between 5000 and 10000 hPA/s (hectopascals per second), for example. Furthermore, the lower mass flow gradient limit can be between 1000 and 2000 kg/s (kilograms per second).

Furthermore, the compressor intake temperature is identified using the temperature correction factor that is dependent upon compressor surge. In other words, the temperature correction factor is used for taking the compressor surge into account. Thus the temperature correction factor can take on an appropriate value depending on whether or not the compressor surge is present.

The ideal gas equation is used as a basis for identifying the compressor intake temperature, according to which:

$$p*V=n*R*T$$

where
p=pressure
V=volume
n=amount of substance
R=universal or molar gas constant
T=temperature Alternatively or in addition, the compressor discharge temperature is identified on the basis of the corrected compressor discharge pressure, wherein the corrected compressor discharge pressure is dependent on the compressor surge. In other words, the corrected compressor discharge pressure is used for taking the compressor surge into account. Thus the corrected compressor discharge pressure can take on an appropriate value depending on whether or not the compressor surge is present.

On the basis of the pressure gradient and the mass flow gradient across the compressor, the occurrence of compressor surge can be detected in an especially simple and robust manner. Consequently, the temperature model for the compressor can reliably take the compressor surge into account.

The pressure gradient can correspond to a maximum pressure gradient over a predetermined time period. Alternatively or in addition, the mass flow gradient can correspond to a minimum mass flow gradient over the predetermined time period.

For example, the pressure gradient can be identified at regular time intervals over the predetermined time period so that multiple pressure gradients are obtained for the predetermined time period. The maximum pressure gradient, which is to say the pressure gradient with the highest value or the highest amount, is identified from these multiple pressure gradients. Similar applies for the identification of the mass flow gradient over the predetermined time period. In this context, the regular time intervals can be between 5 and 15 milliseconds long, for example. In some embodiments the regular time interval can be 10 milliseconds long, for example. In additional embodiments, the predetermined time period can be between 25 and 75 milliseconds long, for example. By the means that the maximum pressure gradient and/or the maximum mass flow gradient over the predetermined time period are checked against the upper pressure gradient limit or lower mass flow gradient limit, slightly delayed processes in the characteristic events of compressor surge, namely the decreasing mass flow across the compressor and the pressure increase after the compressor, can be taken into account. As a result, it is possible to improve a robustness of the detection of compressor surge.

It is possible to take into account heat transfer effects when identifying the compressor intake temperature and/or the compressor discharge temperature. Consequently, it is possible to identify a temperature increase caused by the heat transfer effects. Therefore, it is possible as a result to model the compressor intake temperature and/or the compressor discharge temperature relatively precisely.

Thus, the heat transfer effects can include at least one of the following: wall-heat losses, stored heat, and thermal radiation emanating from hot components.

In this context, wall-heat losses correspond to the loss of heat of the fluid at component walls along the intake tract of the internal combustion engine, with the loss of the heat being caused by convection. The fluid thus emits heat to the component walls.

Furthermore, it is possible to take into account a thermal radiation that heats the fluid. The thermal radiation can be radiated by hot components, such as, e.g., the internal combustion engine or its intake manifold.

The stored heat before the compressor is dependent on a vehicle speed. When the vehicle is traveling more slowly, for example, less mass flow is passed through the compressor, and the effect of a temperature of the internal combustion engine is all the more pronounced. An increasing difference between ambient temperature and the temperature of the internal combustion engine leads to a heating of the fluid before the compressor, which is to say the stored heat increases.

As a result, a compressor intake temperature, for example, can be modeled by offsetting an ambient temperature (which corresponds to a temperature of the indrawn fluid) with a temperature change, generally a temperature increase, resulting from the heat transfer effects. An effect of compressor surge on the compressor intake temperature is not yet taken into account here. According to one embodiment, the temperature increase (on the compressor intake side) resulting from the abovementioned heat transfer effects can thus be added to the ambient temperature in order to obtain the compressor intake temperature, in which process the compressor surge is not yet taken into account. Similar also applies to the modeling of the compressor discharge temperature.

The heat transfer effects can be determined with at least one of the following: characteristic curves and characteristic maps. What is meant here is that it is possible to determine a heat input and a heat output into or out of the fluid and thus a temperature increase or temperature decrease of the fluid. The characteristic curves and/or characteristic maps can be identified in advance and can be stored in an (engine) control unit. As a result, the heat transfer effects can be identified (retrieved) especially easily.

The temperature correction factor can be identified based on a temperature increase due to the compressor surge. Thus a temperature increase of the fluid results because the compressor surge is present. Since the temperature correction factor is based on this temperature increase, the occurrence of the compressor surge can be taken into account especially easily when identifying the compressor intake temperature.

The temperature increase due to the compressor surge can be identified based on a pressure ratio between ambient pressure and a compressor intake pressure. In this case, the relationship between this temperature increase and this pressure ratio can be stored in a characteristic map. Consequently, the temperature correction factor is likewise based on the pressure ratio between the ambient pressure and the compressor intake pressure. As a result, the temperature increase and therefore the temperature correction factor can be identified especially easily.

The temperature increase due to the compressor surge can be modeled with a differentiator with first order lag. As a rule, the temperature increase takes place abruptly and decreases over time. This behavior can be modeled with a DT1 element or a PDT1 element, for example. In this context, these elements are transfer elements that are known from the field of control engineering. As an alternative to the said transfer elements, it is also possible to use elements that have a damped characteristic in the step response. Consequently, the compressor intake temperature can be identified more precisely.

The identified compressor discharge temperature can be based on an uncorrected compressor intake temperature. The uncorrected compressor intake temperature leaves an effect of the compressor surge on the compressor intake temperature unaccounted for. The uncorrected compressor intake temperature thus only takes into account a temperature increase due to the above-described heat transfer effects.

The effect of the compressor surge on the compressor intake temperature is therefore left out during identification of the compressor discharge temperature. Instead, an effect of compressor surge on the compressor discharge temperature can be taken into account with the corrected compressor discharge pressure. As a result, the compressor discharge temperature can be identified more precisely based on an isentropic compression at the compressor.

Here, the following applies to an isentropic compression:

$$\frac{T_2}{T_1} = \left(\frac{p_2}{p_1}\right)^{\frac{\kappa-1}{\kappa}}$$

where
$T_1$=compressor intake temperature
$T_2$=compressor discharge temperature
$p_1$=pressure before the compressor
$p_2$=pressure after the compressor
$\kappa$=isentropic exponent The uncorrected compressor intake temperature can be corrected based on a pressure ratio between ambient pressure and a compressor intake pressure. Consequently a correction of the density of the indrawn fluid takes place. As a result, the compressor intake temperature can be determined more precisely.

An uncorrected compressor intake temperature can be low-pass filtered. By means of the low-pass filtering, a signal that represents the uncorrected compressor intake temperature can be stabilized and/or noise in the signal can be suppressed. Consequently, the compressor intake temperature can be identified more accurately.

Further, for the purpose of error protection, the corrected compressor discharge pressure can correspond to a measured compressor discharge pressure when a pressure ratio across the compressor is less than a pressure ratio limit and the measured compressor discharge pressure is less than a last valid compressor discharge pressure. The last valid compressor discharge pressure is that which is present before the occurrence of the compressor surge. In other words, the last valid compressor discharge pressure is the value for the compressor discharge pressure before an increase in the compressor discharge pressure takes place on account of compressor surge. As a result, the temperature modeling is made more robust.

In this context, the pressure ratio limit can be between 1.3 and 2.8, for example.

When the error protection does not take effect, which is to say the pressure ratio across the compressor is greater than the pressure ratio limit and/or the measured compressor discharge pressure is equal to or greater than the last valid compressor discharge pressure, then the corrected compressor discharge pressure corresponds to the last valid compressor discharge pressure.

The identified compressor discharge temperature can be low-pass filtered. By means of the low-pass filtering, a signal that represents the compressor discharge temperature can be stabilized and/or noise in the signal can be suppressed. Consequently the compressor discharge temperature can be identified more accurately.

A second aspect of the invention relates to a control unit that is equipped to carry out a method according to the above-described embodiments.

A third aspect of the invention relates to a motor vehicle having the above-described control unit. The motor vehicle is equipped and designed to carry out a method according to the above-described embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
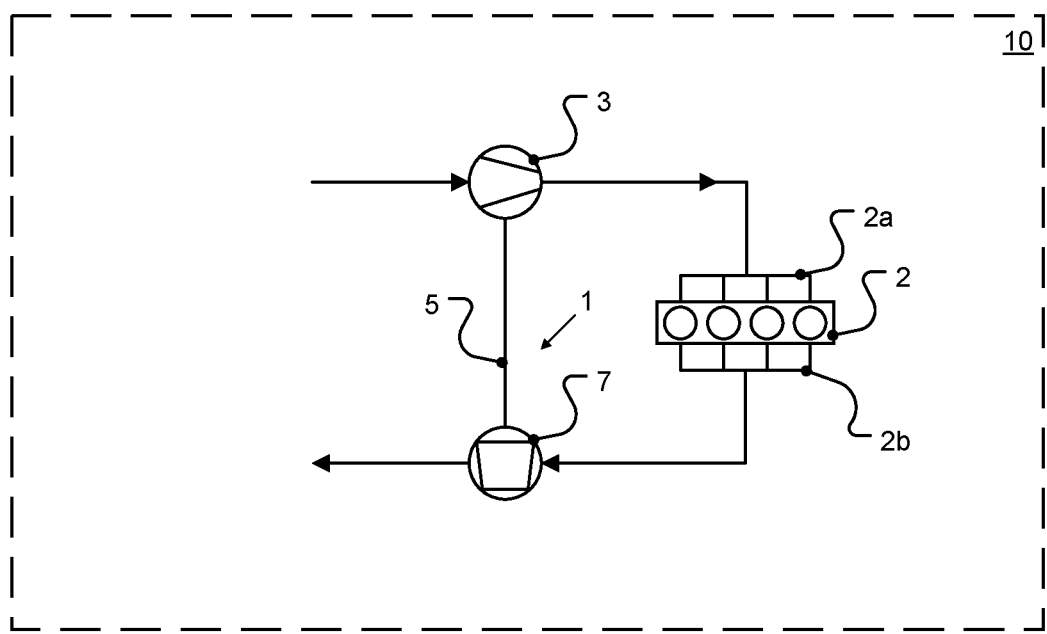
FIG. 1 schematically shows a motor vehicle according to an embodiment.

FIG. 1 shows a motor vehicle 10 with an internal combustion engine 2 and a supercharging system 1. The supercharging system 1 includes a compressor 3 and a turbine 7. The compressor 3 is connected to the turbine 7 by a shaft 5, and consequently can be driven by the turbine 7.

Air drawn in from the environment flows across the compressor 3 and an intake manifold 2a into cylinders of the internal combustion engine 2. The air/fuel mixture produced in the cylinders is burned to create a (vehicle) drive power. The exhaust gas arising from the combustion flows through an exhaust manifold 2b and the turbine 7. Consequently, the turbine 7 can be supplied with and driven by the exhaust gas from the internal combustion engine 2. In this way, the air that is drawn in can be compressed by the compressor 3 depending on the power of the turbine 7.

FIGS. 2 to 6 show models that are used when carrying out an embodiment of the method according to the invention.

Figure 2:
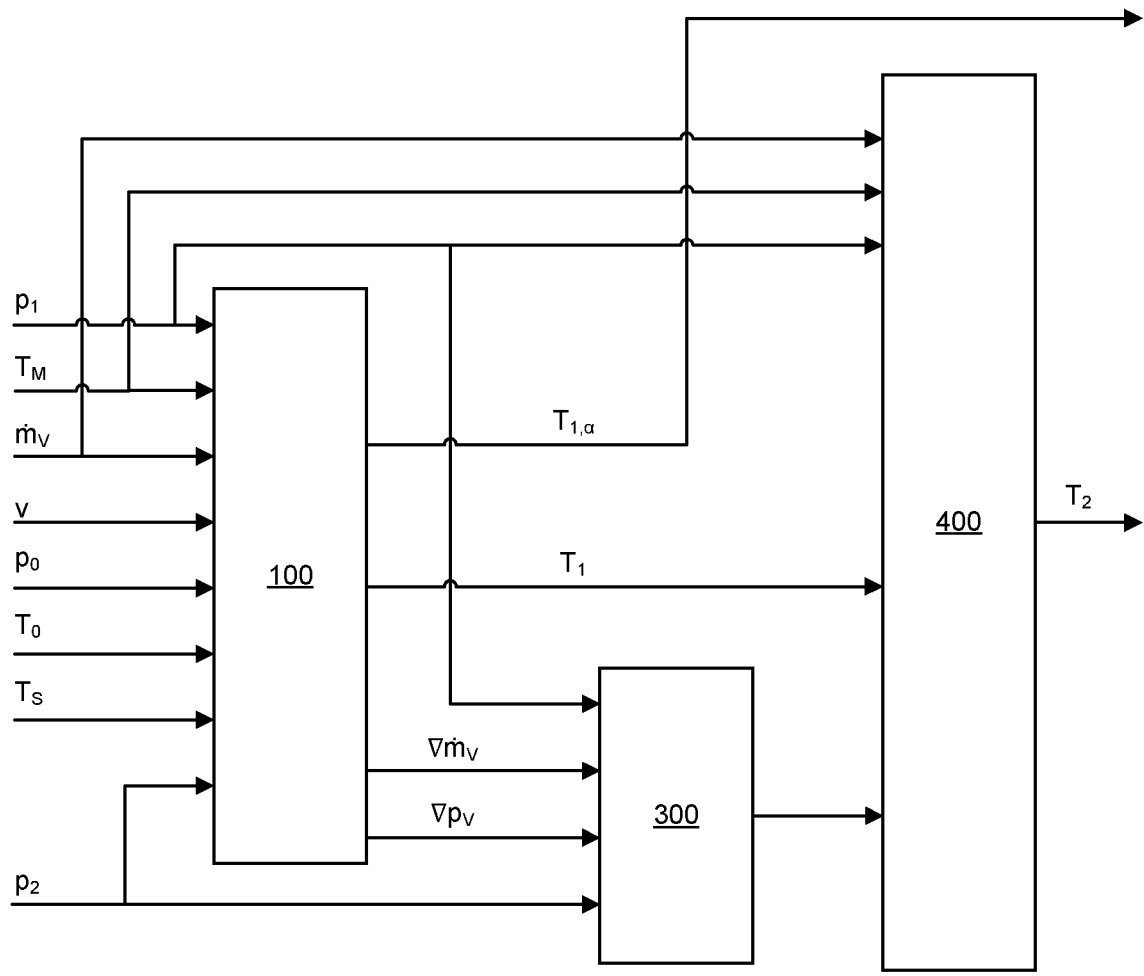
FIG. 2 shows an overall model for determining a compressor intake temperature and a compressor discharge temperature of a fluid.

FIG. 2 shows an overall model for determining a compressor intake temperature $T_{V,E,\alpha}$ and a compressor discharge temperature $T_{V,A}$ while taking into account a compressor surge. The overall model comprises a compressor intake temperature model 100, a pressure determination model 300, and a compressor discharge temperature model 400.

An engine temperature $T_M$, an ambient temperature $T_0$, an intake manifold temperature $T_S$, a vehicle speed v, an ambient pressure $p_0$, a compressor mass flow $m_{ov}$ across the compressor 3, a compressor intake pressure $p_1$ (pressure before the compressor 3), and a compressor discharge pressure $p_2$ (pressure after the compressor 3) enter into the compressor intake temperature model 100 as input quantities. These input quantities can be sensed through appropriate acquisition devices on the vehicle side, for example.

A compressor intake temperature $T_1$, the compressor intake temperature (corrected compressor intake temperature) $T_{1,\alpha}$ that is dependent on compressor surge, a mass flow gradient $\nabla\dot{m}$ across the compressor 3, and a pressure gradient $\nabla p_V$ across the compressor 3 result from the compressor intake temperature model 100 as output quantities.

In the compressor intake temperature model 100, the compressor intake temperature $T_{1,\alpha}$ is identified using a correction factor $\Delta T_{VP,\alpha}$ that is dependent on compressor surge.

The mass flow gradient $\nabla\dot{m}$ and the pressure gradient $\nabla p_V$, the pressure $p_{V,E}$ before the compressor 3, and the pressure $p_{V,A}$ after the compressor 3 enter into the pressure correction model 300 as input quantities.

A corrected compressor discharge pressure $p_{2,\alpha}$ results from the pressure correction model 300 as the output quantity.

The engine temperature $T_M$, the compressor mass flow $m_V$, the compressor intake pressure $p_1$, the corrected compressor discharge pressure $p_{2,\alpha}$, and the (uncorrected) compressor intake temperature $T_1$ enter into the compressor discharge temperature model 400 as input quantities.

The compressor discharge temperature $T_2$ results from the compressor discharge temperature model 400 as the output quantity. In the compressor discharge temperature model 400, the compressor discharge temperature $T_2$ is identified on the basis of a corrected compressor discharge pressure $p_{2,\alpha}$ that is dependent on compressor surge.

Figure 3:
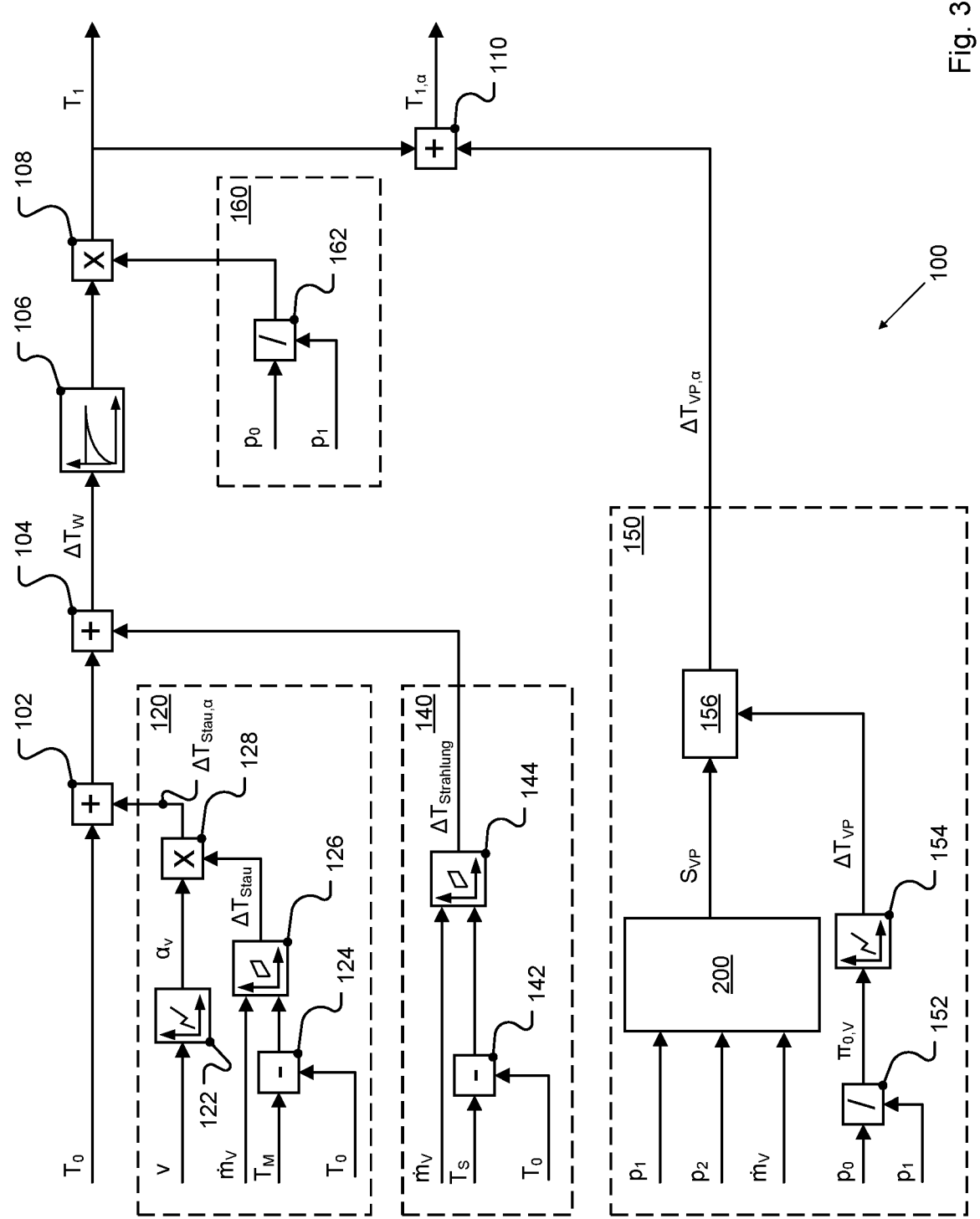
FIG. 3 shows a model for determining the compressor intake temperature.

FIG. 3 shows the compressor intake temperature model 100 for determining the compressor intake temperature $T_{1,\alpha}$ in detail. The ideal gas equation represents the physical basis for the compressor intake temperature model 100. The starting point is the ambient temperature $T_0$, which in the novel approach is heated by thermal radiation from hot components such as the internal combustion engine 2 and the intake manifold 2a. Thus the compressor intake temperature model 100 comprises a stored heat model 120 for taking stored heat into account, a thermal radiation model 140 for taking thermal radiation into account, a temperature correction model 150 for taking a temperature increase due to the occurrence of compressor surge into account, and a pressure ratio correction model 160 for taking environmental conditions in the form of the ambient pressure into account.

In the stored heat model 120, a vehicle speed correction factor $\alpha_v$ is identified from the vehicle speed v using a characteristic curve 122. The vehicle speed correction factor $\alpha_v$ takes into account an effect of the vehicle speed v on the stored heat. In addition, a difference between the engine temperature $T_M$ and the ambient temperature $T_0$ is calculated in the subtraction block 124. From this difference and the compressor mass flow $m_v$, a stored heat temperature increase $\Delta T_{Stau}$ due to the stored heat can be identified using a characteristic map 126. In the multiplication block, the vehicle speed correction factor $\alpha_v$ and the stored heat temperature increase $\Delta T_{Stau}$ are multiplied by one another in order to obtain a corrected stored heat temperature increase $\Delta T_{Stau,\alpha}$ that takes into account the vehicle speed v and is supplied to a summation block 102.

In the thermal radiation model 140, a difference between intake manifold temperature $T_S$ and the ambient temperature $T_0$ is calculated in a subtraction block 142. With the characteristic map 144, a thermal radiation temperature increase $\Delta T_{Strahlung}$ due to thermal radiation can be identified from this difference and the compressor mass flow $\dot{m}_V$. The thermal radiation temperature increase $\Delta T_{Strahlung}$ is supplied to a summation block 104 and added to the result of the summation block 102. The result of the summation block 104 thus corresponds to the heating of the ambient temperature $T_0$ due to stored heat and thermal radiation.

With the stored heat model 120 and the thermal radiation model 140, the physical effects in the case of engine cold start and stored heat in the case of relatively long idle periods are taken into account.

The result of the summation block 104 is a heat effect temperature increase $\Delta T_W$ on account of heat effects, which is to say stored heat and/or thermal radiation in the present case. This temperature increase $\Delta T_W$ is supplied to an (optional) low-pass filter 106.

The pressure ratio between the ambient pressure $p_0$ and the compressor intake pressure $p_1$ is identified in the pressure ratio correction model 160 and taken into account by the compressor intake temperature model 100. With the pressure ratio correction model 160, the effect of the ambient pressure on the thermal capacity of the air can be taken into account. Thus, in a multiplication block 108, the heat effect temperature increase $\Delta T_W$ is multiplied by the pressure ratio between the ambient pressure $p_0$ and the compressor intake pressure $p_1$ for a density correction. Consequently, the (uncorrected) compressor intake temperature $T_1$ is obtained from the multiplication block 108. The compressor discharge temperature $T_1$ thus obtained does not yet take any occurrence of compressor surge into account.

In order to take the occurrence of compressor surge into account, the temperature correction model 150 is provided. The temperature correction model 150 comprises a compressor surge detection model 200, with which it is possible to detect an occurrence of compressor surge. On the input side, the compressor intake pressure $p_1$, the compressor discharge pressure $p_2$, and the compressor mass flow $\dot{m}_V$ enter into the compressor surge detection model 200. On the output side, a signal $S_{PV}$ is produced that indicates an occurrence of compressor surge.

Figure 4:
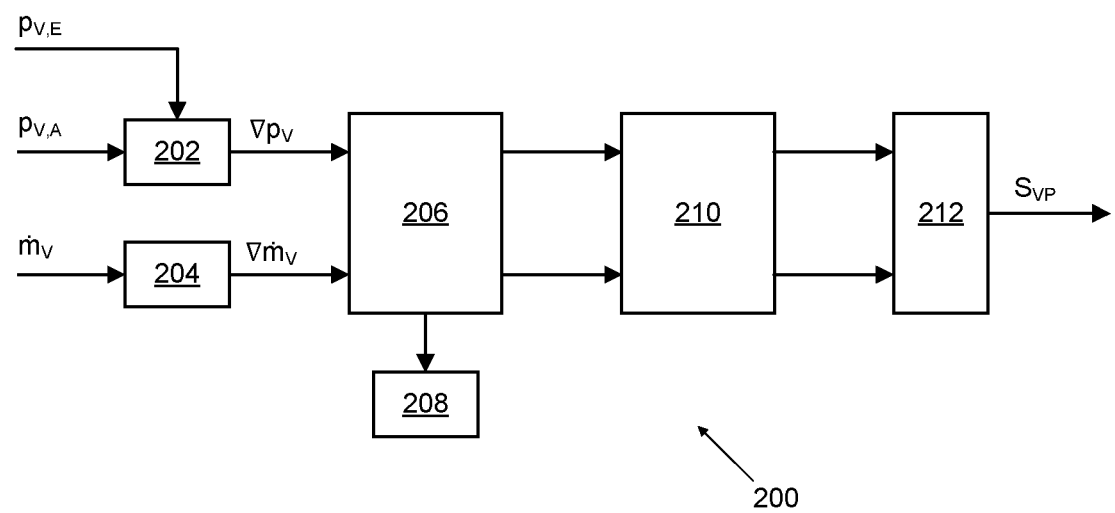
FIG. 4 shows a model for detecting compressor surge.

The compressor surge detection model 200 is shown in detail in FIG. 4. Characteristic of compressor surge is a sharply decreasing mass flow across the compressor 3 with a simultaneous (or occurring with a slight delay) comparatively sharp pressure increase after the compressor 3. This behavior is made use of in the compressor surge detection model 200 for detecting compressor surge.

In the compressor surge detection model 200, the compressor intake pressure $p_1$ and the compressor discharge pressure $p_2$ are supplied to a block 202 for identifying the pressure gradient $\nabla p_V$ across the compressor 3. Furthermore, the compressor mass flow $\dot{m}_V$ is supplied to a block 204 for identifying the mass flow gradient $\nabla \dot{m}_V$.

In block 206, the results of the gradient calculations from the blocks 202, 204 are stored. Here, the results can come from multiple calculations. Thus five calculations can take place, for example. The gradient calculations in the blocks 202, 204 can be carried out every 5 to 15 milliseconds, for example. In some embodiments, the gradient calculations can be carried out every 10 milliseconds. By the means that the gradient calculations are performed over a predetermined time period, such as 50 milliseconds, it is possible for slightly delayed processes of the described characteristics to be taken into account for surge events. Consequently, the robustness of detecting compressor surge can be increased.

In block 208, a maximum pressure gradient $\nabla p_{V,max}$ is identified by means of the pressure gradient $\nabla p_V$ across the compressor 3. Optionally, a minimum mass flow gradient $\nabla \dot{m}_{V,min}$ can be identified in block 208 by means of the mass flow gradient $\nabla \dot{m}_V$.

In block 210, the maximum pressure gradient $\nabla p_{V,max}$ and the minimum mass flow gradient $\nabla \dot{m}_{V,min}$ are checked against appropriate thresholds or limits. If the maximum pressure gradient $\nabla p_{V,max}$ exceeds an upper pressure gradient limit $\nabla p_{V,lim}$ and the minimum mass flow gradient $\nabla \dot{m}_{V,min}$ falls below a lower mass flow gradient limit $\nabla \dot{m}_{V,lim}$, then the compressor surge detection signal $S_{VP}$ is output in an AND block 212. Thus, it is identified in block 212 that the compressor surge is present if the pressure gradient $\nabla p_V$ exceeds the upper pressure gradient limit $\nabla p_{V,lim}$ and the mass flow gradient $\nabla \dot{m}_{V,min}$ falls below the lower mass flow gradient limit $\nabla \dot{m}_{V,lim}$. As mentioned above, the compressor surge detection signal $S_{VP}$ signals a presence/occurrence of compressor surge through the compressor 3.

During compressor surge, a flow stall arises in which a backflow of hot compressed air (before the compressor 3) takes place. Consequently, an abrupt compressor surge temperature increase $\Delta T_{VP}$ occurs at the compressor intake during the surge event, wherein the abrupt temperature increase diminishes over time. The compressor surge temperature increase $\Delta T_{VP}$ is dependent on the ratio $\pi_{0,V}$ between the ambient pressure $p_0$ and the compressor intake pressure $p_1$, wherein the ratio is identified in block 152. The relationship between compressor surge temperature increase $\Delta T_{VP}$ and the ratio $\pi_{0,V}$ is stored in a characteristic curve 154.

The compressor surge temperature increase $\Delta T_{VP}$ initially rises abruptly and then decreases over time. Therefore, the compressor surge temperature increase $\Delta T_{VP}$ has a behavior that can be modelled with a differentiator with first order lag (DT1). This behavior can then be represented as a correction. To this end, the temperature correction model 150 has a block 156 into which the compressor surge temperature increase $\Delta T_{VP}$ and the compressor surge detection signal $S_{VP}$ enter on the input side. Block 156 models a DT1 behavior. In other words, block 156 includes a DT1 element. A corrected compressor temperature increase $\Delta T_{VP,\alpha}$ is produced by block 156 on the output side. The corrected compressor temperature increase $\Delta T_{VP,\alpha}$ is thus the correction factor that is dependent on compressor surge.

In the summation block 110, the compressor intake temperature $T_1$ is summed with the corrected compressor temperature increase $\Delta T_{VP,\alpha}$ to identify a corrected compressor intake temperature $T_{1,\alpha}$. The corrected compressor intake temperature $T_{V,E,\alpha}$ corresponds to a compressor intake temperature while taking compressor surge into account.

Figure 5:
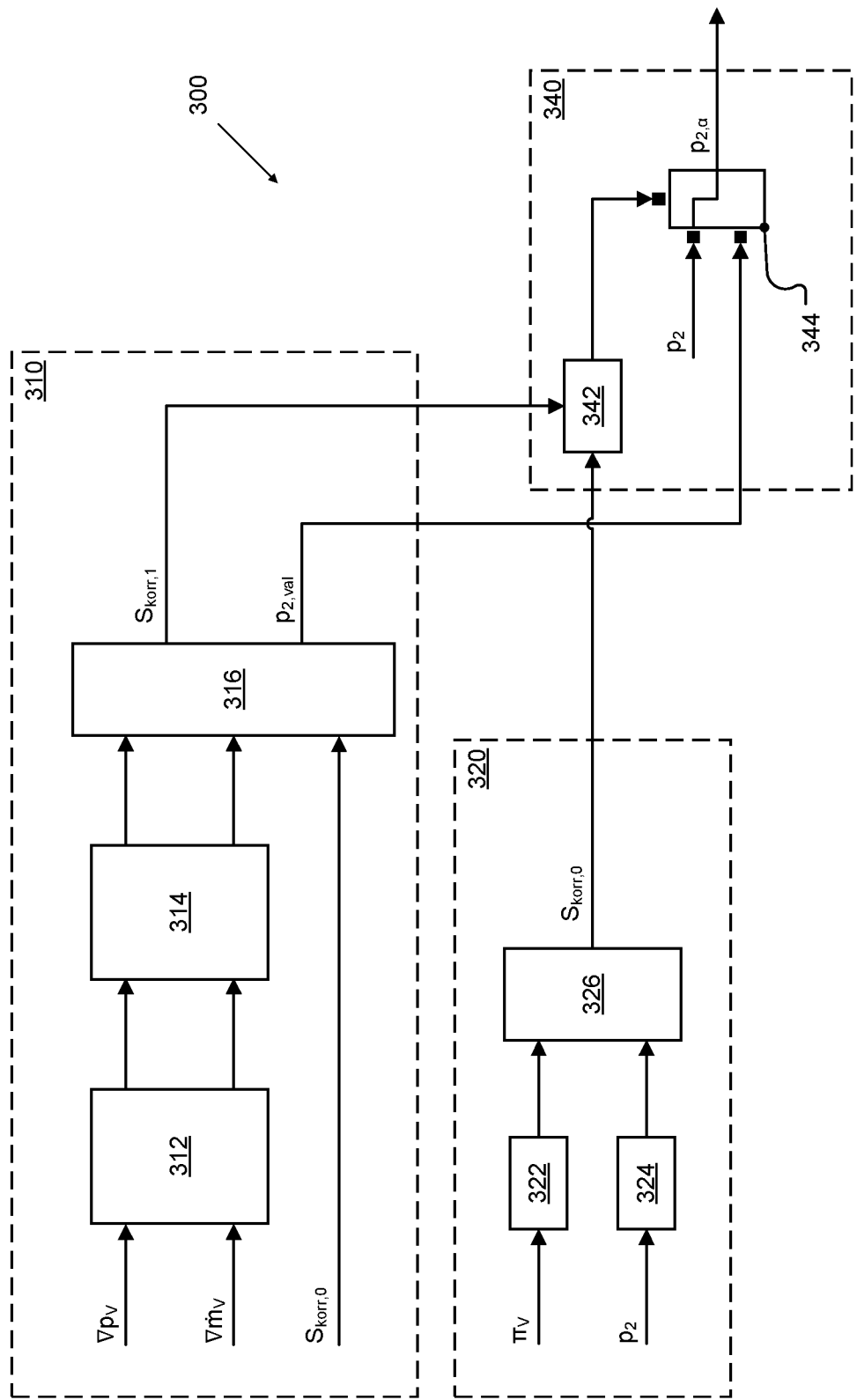
FIG. 5 shows a model for pressure determination of a compressor discharge pressure.

In FIG. 5, the pressure determination model 300 is shown in detail. The pressure peaks that arise during compressor surge are brought about by the closing of the throttle valve and have no physical effect on the isentropic compression. For this reason, a corrected compressor discharge pressure $p_{2,\alpha}$ can be identified with the aid of the pressure determination model 300.

Thus, it is first checked in block 310 whether a pressure correction should be activated.

To this end, the results of the gradient calculations from the blocks 202, 204 are stored in block 312. Here, the results may originate from multiple calculations. In addition, the maximum pressure gradient $\nabla p_{V,max}$ and the minimum mass flow gradient $\nabla \dot{m}_{V,min}$ are identified in block 312. In block 314, the maximum pressure gradient $\nabla p_{V,max}$ and the minimum mass flow gradient $\nabla \dot{m}_{V,min}$ are checked against appropriate thresholds or limits.

In AND block 316, the following is checked: whether the maximum pressure gradient $\nabla p_{V,max}$ exceeds the upper pressure gradient limit $\nabla p_{V,lim}$; whether the minimum mass flow gradient $\nabla \dot{m}_{V,min}$ falls below the lower mass flow gradient limit $\nabla \dot{m}_{V,lim}$; and whether a pressure correction deactivation signal $S_{korr,0}$ is present.

If the above three conditions are answered in the affirmative, then a pressure correction activation signal $S_{korr,1}$ and a last valid pressure value $p_{2,val}$ for the compressor discharge pressure are produced from the AND block 316 on the output side. The last valid compressor discharge pressure $p_{2,val}$ is that which is present before the occurrence of the compressor surge. In other words, the last valid compressor discharge pressure $p_{2,val}$ is the value for the compressor discharge pressure $p_2$ before an increase in the compressor discharge pressure $p_2$ takes place on account of compressor surge.

Since the blocks 312, 314, and 316 are, in principle, directed toward the detection of compressor surge, a check can be made in block 316 for a presence of the compressor surge detection signal $S_{VP}$ from the compressor surge detection model 200 as an alternative to the output quantities from blocks 312, 314.

The pressure correction model 300 comprises error protection 320 that uses two boundary conditions. Firstly, the corrected compressor discharge pressure $p_{2,\alpha}$ must be less than the measured compressor discharge pressure $p_2$. Secondly, compressor surge only occurs at a high pressure ratio $\pi_V$ across the compressor 3. If this falls below a minimum pressure ratio limit $\pi_{V,lim}$, then the pressure correction is terminated.

For this purpose, it is identified in block 322 of the error protection 320 whether the pressure ratio $\pi_V$ across the compressor 3, which is to say the compressor discharge pressure $p_2$ divided by the compressor intake pressure $p_1$, is less than the pressure ratio limit $\pi_{V,lim}$. Here, the pressure ratio limit $\pi_{V,lim}$ can be between 1.3 and 2.8, for example.

In block 324, it is identified whether the measured compressor discharge pressure $p_2$ is less than the last valid compressor discharge pressure $p_{V,A,val}$. If the pressure ratio $\pi_V$ is less than the pressure ratio limit $\pi_{V,lim}$ and the compressor discharge pressure $p_2$ is less than the last valid compressor discharge pressure $p_{2,val}$, then a pressure correction deactivation signal $S_{korr,0}$ is produced by an AND block 326.

In block 340, it is identified whether the pressure correction is carried out. In other words, the value that the corrected compressor discharge pressure $p_{2,\alpha}$ takes on is identified in block 340. For this purpose, the pressure correction activation signal $S_{korr,1}$ from the block 310 and, if applicable, the pressure correction deactivation signal $S_{korr,0}$ from the error protection 320 go into the block 342 on the input side. When the pressure correction deactivation signal $S_{korr,0}$ is present at the input side on block 342, then the pressure correction deactivation signal $S_{korr,0}$ also results from the block 342 on the output side. If no pressure correction deactivation signal $S_{korr,0}$ results from the error protection 320 and only the pressure correction activation signal $S_{korr,1}$ is present at the input side on block 342, the pressure correction activation signal $S_{korr,1}$ is produced by the block 342 on the output side. The output quantity of the block 342 is supplied to a switch 344.

The corrected compressor discharge pressure $p_{2,\alpha}$ is produced by the switch 344 on the output side. When the pressure correction activation signal $S_{korr,1}$ is present in the switch 344 on the input side, then the corrected compressor discharge pressure $p_{2,\alpha}$ corresponds to the last valid compressor discharge pressure $p_{2,val}$. When the pressure correction deactivation signal $S_{korr,0}$ is present in the switch 344 on the input side, then the compressor discharge pressure $p_{2,\alpha}$ corresponds to the measured compressor discharge pressure $p_2$.

Figure 6:
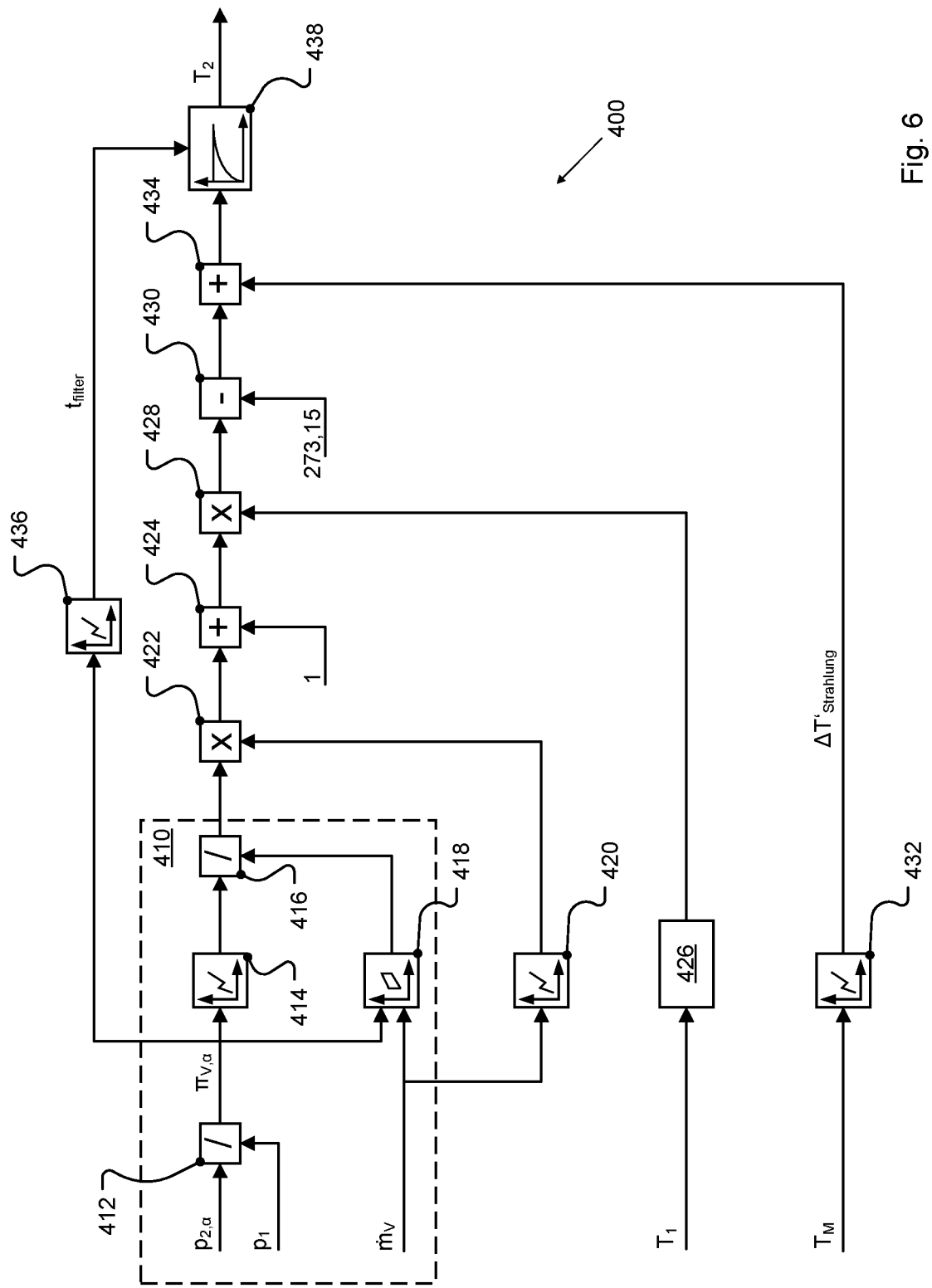
FIG. 6 shows a model for determining the compressor discharge temperature.

In FIG. 6, the compressor discharge temperature model 400 is shown in detail. The temperature modeling at the discharge of the compressor is based on the above-described compressor intake temperature $T_1$ in which the temperature increase on account of compressor surge is excluded, on the isentropic compression, and on corrections, such as for taking engine cold start into account. The exclusion of the temperature increase on account of compressor surge is necessary because a reversal of the flow direction of the mass flow through the compressor 3 occurs during compressor surge. Accordingly, a causal relationship no longer exists between the compressor discharge temperature $T_2$ and the compressor intake temperature $T_1$, and a correction of the compressor intake temperature $T_1$ becomes necessary. The reason for this is that chaotic conditions are present across the compressor 3. Thus the compressor intake temperature $T_1$ is increased by a backflow. However, since almost no compressor output is being provided any more, the compressor discharge temperature $T_2$ is no longer increasing significantly. As a result, the effects of compressor surge are taken into account in determining the compressor intake temperature In the compressor discharge temperature model 400, the following output quantity is first identified in a block 410:

$$\frac{\left(\frac{p_{2,\alpha}}{p_1}\right)^{\frac{\kappa-1}{\kappa}}}{\eta_V}$$

For this purpose, in block 412 a corrected pressure ratio $\pi_{V,\alpha}$ across the compressor 3 is identified that corresponds to a ratio of the corrected compressor discharge pressure $p_{2,\alpha}$ divided by the compressor intake pressure $p_1$. The relationship between the isentropic exponent $\kappa$ and the corrected pressure ratio $\pi_{V,\alpha}$ is stored in a $$\left(\frac{p_{2,\alpha}}{p_1}\right)^{\frac{\kappa-1}{\kappa}}$$

compression model 414. Consequently, the isentropic compression term is identified as the output quantity from the compression model 414 using the corrected pressure ratio $\pi_{V,\alpha}$ and the isentropic exponent $\kappa$.

With knowledge of the compressor mass flow $\dot{m}_V$ and of the corrected pressure ratio $\pi_{V,\alpha}$, the compressor efficiency $\eta_V$ is identified using a compressor efficiency characteristic map 418.

In block 416, the isentropic compression term $$\left(\frac{p_{2,\alpha}}{p_1}\right)^{\frac{\kappa-1}{\kappa}}$$

is divided by the compressor efficiency $\eta_V$, so the above-mentioned output quantity of block 410 is obtained.

Using a compressor-discharge-side wall heat loss characteristic map 420, with knowledge of the compressor mass flow $\dot{m}_V$, a wall heat loss correction factor $\alpha_{konv}$ is identified that is then multiplied by the result of the block 416 in the multiplication block 422 so that a factor is produced by the multiplication block 422 on the output side that takes into account an effect of the compression and of wall heat losses on the compressor discharge temperature $T_2$.

In the optional block 426, the temperature unit of the compressor intake temperature $T_1$ (without taking compressor surge into account) is converted from degrees Celsius into Kelvin.

In the summation block 424, the value "1" is added to the output quantity of the block 422.

In the multiplication block 428, the compressor intake temperature $T_1$ that has been converted into Kelvin is multiplied by the output quantity from block 424.

In the subtraction block 430, the output quantity from block 428, whose temperature unit is given in Kelvin, is converted into degrees Celsius.

With knowledge of the engine temperature $T_M$, a thermal radiation temperature increase $\Delta T'_{Strahlung}$ on the compressor discharge side on account of thermal radiation is identified using a compressor-discharge-side thermal radiation characteristic map 432.

The temperature increase is added to the output quantity from the block 430 in the summation block 434.

Optionally, with knowledge of the corrected pressure ratio $\pi_{V,\alpha}$, a filter time $t_{filter}$ for dynamic forming is identified using a filter time characteristic map 436.

The filter time $t_{filter}$ is used in the (optional) low-pass filtering 438. The compressor discharge temperature model 400 can be made dynamic using the low-pass filtering 438 as a function of the filter time $t_{filter}$.

On the output side, the (modeled) compressor discharge temperature $T_2$ results from the low-pass filtering 438. Here, the compressor discharge temperature model 400 takes into account any compressor surge that may occur.

Figure 7:
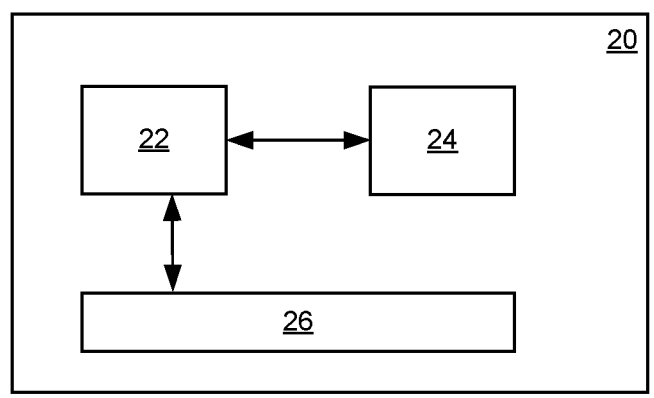
FIG. 7 schematically shows a control unit according to one embodiment.

FIG. 7 schematically shows an exemplary control unit 20 that is equipped to carry out the above-described methods/ models. The control unit 20 comprises a processor 22, a memory 24, and an interface 26. The memory 24 serves to store data such as, e.g., the above-mentioned characteristic maps, characteristic curves, or models 122, 126, 144, 154, 414, 418, 420, 432, 436. These characteristic maps and characteristic curves may have been identified beforehand on test stands. Furthermore, software that is designed to carry out the above-described methods is also stored in the memory 24. The processor 22 is designed to carry out program instructions of the software. The interface 26 is also designed to receive and transmit data. It can be, for example, an interface to a CAN bus of the motor vehicle 10, through which the control unit receives measured values from sensors, such as the input quantities for the compressor intake temperature model 100 and the like, and sends control commands.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for modeling a compressor intake temperature and/or a compressor discharge temperature of a compressor taking into account a compressor surge, the method comprising:
    identifying a pressure gradient across the compressor;
    identifying a mass flow gradient across the compressor;
    establishing that the compressor surge is present when the pressure gradient exceeds an upper pressure gradient limit and the mass flow gradient falls below a lower mass flow gradient limit; and
    identifying the compressor intake temperature with a temperature correction factor that is dependent on the compressor surge and/or identifying the compressor discharge temperature on the basis of a corrected compressor discharge pressure that is dependent on the compressor surge, the compressor intake temperature and/or the compressor discharge temperature being used to determine a turbocharger speed and a base boost pressure of an internal combustion engine.

2. The method according to claim 1, wherein the pressure gradient corresponds to a maximum pressure gradient over a predetermined time period and/or the mass flow gradient corresponds to a minimum mass flow gradient over the predetermined time period.

3. The method according to claim 1, wherein the identification of the compressor intake temperature and/or the compressor discharge temperature takes heat transfer effects into account.

4. The method according to claim 3, wherein the heat transfer effects include at least one of the following: wall-heat losses, stored heat, and thermal radiation emanating from components.

5. The method according to claim 3, wherein the heat transfer effects are determined with at least one of the following: characteristic curves and characteristic maps.

6. The method according to claim 1, wherein the temperature correction factor is identified based on a compressor surge temperature increase.

7. The method according to claim 6, wherein the compressor surge temperature increase is identified based on a pressure ratio between ambient pressure and a compressor intake pressure.

8. The method according to claim 7, wherein the compressor surge temperature increase is modeled with a differentiator with first order lag.

9. The method according to claim 1, wherein the identified compressor discharge temperature is based on an uncorrected compressor intake temperature, wherein the uncorrected compressor intake temperature has not been corrected with the temperature correction factor that is dependent upon the compressor surge.

10. The method according to claim 8, wherein the uncorrected compressor intake temperature is corrected based on a pressure ratio between ambient pressure and a compressor intake pressure.

11. The method according to claim 1, wherein the uncorrected compressor intake temperature is low-pass filtered.

12. The method according to claim 1, wherein for the purpose of error protection, the corrected compressor discharge pressure corresponds to a measured compressor discharge pressure when a pressure ratio across the compressor is less than a pressure ratio limit and a compressor discharge pressure is less than a last valid compressor discharge pressure.

13. The method according to claim 1, wherein the compressor discharge temperature is low-pass filtered.

14. A control unit that is equipped to carry out a method according to claim 1.

15. A motor vehicle having a control unit, wherein the motor vehicle is equipped and designed to carry out the method according to claim 1.

* * * * *